(12) United States Patent
Li et al.

(10) Patent No.: US 12,445,011 B2
(45) Date of Patent: *Oct. 14, 2025

(54) ORAL CAVITY CLEANING DEVICE

(71) Applicant: Shenzhen Soocas Technology Co., Ltd., Shenzhen (CN)

(72) Inventors: Junhui Li, Shenzhen (CN); Fandi Meng, Shenzhen (CN)

(73) Assignee: SHENZHEN SOOCAS TECHNOLOGY CO., LTD., Shenzhen (CN)

( * ) Notice: Subject to any disclaimer, the term of this patent is extended or adjusted under 35 U.S.C. 154(b) by 304 days.

This patent is subject to a terminal disclaimer.

(21) Appl. No.: 18/178,227

(22) Filed: Mar. 3, 2023

(65) Prior Publication Data

US 2024/0048021 A1 Feb. 8, 2024

(30) Foreign Application Priority Data

Aug. 5, 2022 (CN) .......................... 202210938644.X

(51) Int. Cl.
*H02K 5/20* (2006.01)
*A61C 17/028* (2006.01)
*H02K 5/24* (2006.01)

(52) U.S. Cl.
CPC ............. *H02K 5/24* (2013.01); *A61C 17/028* (2013.01)

(58) Field of Classification Search
CPC ..... A61C 17/028; A61C 17/16; A61C 17/222; A61C 17/227; A61C 17/36; A61C 17/225; A46B 13/00; H02K 7/14; H02K 7/145; H02K 7/16; H02K 7/06; H02K 7/061; H02K 35/00–06; H02K 1/34; H02K 33/00–18; H02K 5/22; H02K 7/003; H02K 2207/00
See application file for complete search history.

(56) References Cited

U.S. PATENT DOCUMENTS

| 2009/0083919 A1* | 4/2009 | Taggart ................ A46B 13/023 15/186 |
| 2017/0007384 A1* | 1/2017 | Wagner .............. A61C 17/0205 |
| 2017/0027674 A1* | 2/2017 | Kleppen ................. A61C 17/22 |
| 2017/0056145 A1* | 3/2017 | Sedic .................. A61C 17/3481 |

(Continued)

FOREIGN PATENT DOCUMENTS

| CN | 104023670 A | 9/2014 |
| CN | 104665243 A | 6/2015 |

(Continued)

OTHER PUBLICATIONS

1st Office Action of corresponding Russian Application No. 2023104485/14—English translation.

(Continued)

*Primary Examiner* — Justine R Yu
*Assistant Examiner* — Matthew R Moon
(74) *Attorney, Agent, or Firm* — Andrew C. Cheng

(57) ABSTRACT

The present disclosure provides an oral cavity cleaning device. The oral cavity cleaning device includes: a sonic motor, a fluid mechanism, a housing, a front cushion, and a rear cushion. By means of the oral cavity cleaning device of the present disclosure, vibration transmitted by the motor to a handle housing can be reduced, a vibration noise is reduced, and use experience of a user is improved.

11 Claims, 4 Drawing Sheets

(56) References Cited

U.S. PATENT DOCUMENTS

| | | | |
|---|---|---|---|
| 2018/0008388 A1 | 1/2018 | Lee | |
| 2018/0147038 A1* | 5/2018 | Fugger | A61C 17/225 |
| 2020/0397546 A1 | 12/2020 | Miller et al. | |
| 2021/0085436 A1 | 3/2021 | Evans et al. | |
| 2021/0386535 A1* | 12/2021 | Hu | A61C 17/3418 |
| 2024/0041581 A1* | 2/2024 | Li | A61C 17/225 |
| 2024/0108447 A1* | 4/2024 | Scherzinger | A46B 9/04 |

FOREIGN PATENT DOCUMENTS

| | | | |
|---|---|---|---|
| CN | 205286575 U | | 6/2016 |
| CN | 108542533 A | | 9/2018 |
| CN | 111603261 A | * | 9/2020 |
| CN | 214049160 U | * | 8/2021 |
| CN | 216724839 U | | 6/2022 |
| RU | 2518963 C2 | | 6/2014 |

OTHER PUBLICATIONS

2nd Office Action of corresponding Russian Application No. 2023104485/14—English translation.
Extended European Search Report of EP23159565.3 dated Dec. 18, 2023.

* cited by examiner put-in direction

ORAL CAVITY CLEANING DEVICE

CROSS-REFERENCE TO RELATED APPLICATIONS

This application claims the benefit of Chinese Application No. 202210938644.X, filed on Aug. 5, 2022. The entire disclosure of the above application is incorporated herein by reference.

TECHNICAL FIELD

The present disclosure relates to the technical field of oral cavity cleaning, in particular to an oral cavity cleaning device.

BACKGROUND

With the improvement of living standards, people's awareness of oral care gradually increases, oral cavity cleaning tools are more diversified in the market. An oral irrigator and an electric toothbrush, substitutes of dental flosses, become one of essential small household appliances, and their basic working principle is to pump water from a water tank by a pump and spray out a high-pressure pulsed water flow for hundreds of times or even thousands of times per minute by a nozzle to clean food debris in gaps between teeth and dental plaques and massage gums so as to improve an oral environment.

As for an existing oral cavity cleaning device, a motor may have large vibration when running, arrangement of a mounting structure of the motor is unreasonable, vibration generated during work is very large, the motor vibrates to bump against a housing and a circuit control panel, moreover, a motor shaft, when rotating rapidly forwards and backwards, may also bump against the housing, consequently, a large noise is generated, then use experience of a user is affected, the motor is also prone to being loosened and damaged, and thus a service life of the motor is shortened.

SUMMARY

A main objective of the present disclosure is to provide an oral cavity cleaning device, which can reduce vibration transmitted by a motor to a handle housing, reduce vibration noise and improve use experience of a user.

In order to realize the above objective, according to an aspect of the present disclosure, an oral cavity cleaning device is provided and includes:
- a sonic motor, including a motor body and a power output shaft, wherein the motor body has an output axis extending in a power output direction, and the power output shaft is a columnar object extending along the output axis and penetrating through the motor body, the power output shaft is configured to cooperate with the motor body and transmit output power of the motor body, the power output shaft has an axial channel parallel to the output axis and a first inlet and a first outlet communicating with the axial channel;
- a fluid mechanism, having a fluid inlet and a fluid outlet, wherein the fluid outlet communicates with the first inlet;
- a housing, extending in an axial direction of the power output shaft and forming a tubular structure with a hollow interior, wherein the housing includes a core mounting part, a mounting rack is arranged in the core mounting part and has a motor chamber and a pump chamber, the sonic motor is mounted in the motor chamber, and the fluid mechanism is mounted in the pump chamber;
- a front cushion, arranged at a front end of the sonic motor in a sleeved manner, wherein the front end of the sonic motor is mounted in the core mounting part by the front cushion; and
- a rear cushion, arranged at a rear end of the sonic motor in a sleeved manner, wherein the rear end of the sonic motor is mounted in the motor chamber by the rear cushion.

Further, multi-point elastic contact is formed between a periphery of the mounting rack and an inner wall of the core mounting part.

Further, a plurality of first elastic bosses are arranged on the periphery of the mounting rack at intervals in an extending direction of the output axis, and the multi-point elastic contact is formed between the mounting rack and the inner wall of the core mounting part by the first elastic bosses.

Further, the mounting rack includes a mounting seat, the motor chamber is arranged on the mounting seat, mounting side plates are respectively arranged on two opposite sides of the mounting seat, the two mounting side plates extend away from each other, and the first elastic bosses are arranged at edges of the mounting side plates away from the mounting seat.

Further, slots penetrating each of the mounting side plates in a thickness direction are formed in the mounting side plates, and connecting arms located on one side of each of the slots away from the mounting seat protrude in a direction away from the mounting seat to form the first elastic bosses.

Further, mounting slots are formed in the inner wall of the core mounting part, the mounting slots extend in a mounting direction of the mounting rack, and the mounting side plates are clamped in the mounting slots.

Further, second elastic bosses are formed on two opposite side walls of each of the mounting side plates, the second elastic bosses protrude towards side walls of the mounting slots, and multi-point elastic contact is formed between the mounting side plates and the side walls of the mounting slots by the second elastic bosses.

Further, surfaces of the second elastic bosses are arc-shaped.

Further, in a put-in direction of the core mounting part, the first elastic bosses and the second elastic bosses are in staggered distribution.

Further, the front cushion has a damping plane, a first strip wall protruding towards the damping plane is arranged on the inner wall of the core mounting part, and the first strip wall is tightly pressed and abuts against the damping plane.

Further, on a side where the damping plane is located, a damping boss is arranged on the rear cushion, a second strip wall protruding towards the damping boss is arranged on the inner wall of the core mounting part, and the second strip wall is tightly pressed and abuts against the damping boss.

Further, a limiting groove is formed in the damping boss, there are two second strip walls, an edge of one of the second strip walls abuts against a groove wall of the limiting groove, and an edge of the other second strip wall abuts against the other groove wall of the limiting groove.

Further, on a side opposite to the damping plane, supporting planes are arranged at two sides edges of both the front cushion and the rear cushion, third strip walls protruding towards the supporting planes are arranged on the inner wall of the core mounting part, and the third strip walls are tightly pressed and abut against the supporting planes of the front cushion and the rear cushion.

Further, on a side where the supporting plane of the front cushion is located, a plurality of spacing ribs are arranged on the front cushion, and a wire passing channel is formed between every two adjacent spacing ribs.

Further, the oral cavity cleaning device further includes a control panel, the front cushion further includes a clamping protrusion, a clamping groove is formed in the clamping protrusion, a mounting boss is arranged on the rear cushion, a positioning groove is formed in the mounting boss, a mounting platen is arranged on the mounting rack, an avoidance groove is formed in the installing platen, one end of the control panel is clamped onto the mounting platen, the other end of the control panel is clamped into the clamping groove, a middle of the control panel is arranged in the positioning groove, and a height of the control panel is smaller than a height of each of the front cushion, the rear cushion and the mounting platen.

By applying the technical solution of the present disclosure, the sonic motor cooperates with the core mounting part by the front cushion and the rear cushion, the sonic motor may be not in direct contact with the core mounting part by means of the front cushion and the rear cushion, so the sonic motor can be damped by means of damping performance of the front cushion and the rear cushion, the sonic motor is prevented from being in direct contact with the housing, vibration transmitted by the sonic motor to the core mounting part can be effectively reduced, vibration felt when a handle is held is reduced, the vibration noise is reduced, and the use experience of the user is improved.

BRIEF DESCRIPTION OF THE DRAWINGS

Accompanying drawings of the specification, which constitute a part of the present application, are used for providing further understanding of the present disclosure, and exemplary embodiments and their description of the present disclosure are used for explaining the present disclosure but do not constitute an inappropriate limitation on the present disclosure. In the accompanying drawings.

Figure 1:
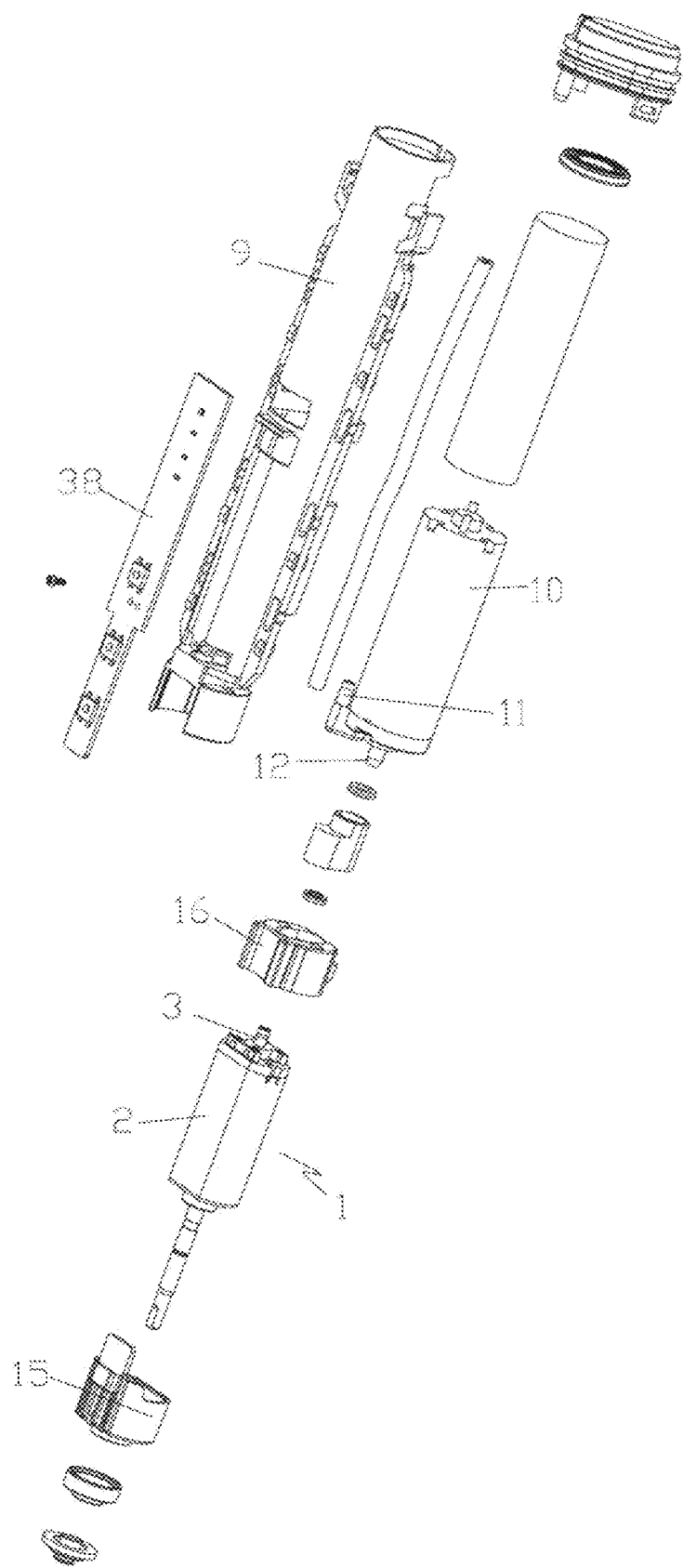
FIG. 1 shows a schematic structural exploded view of a core of an oral cavity cleaning device of an embodiment of the present disclosure.

The above accompanying drawings include the following reference numerals:

1, sonic motor; 2, motor body; 3, power output shaft; 4, axial channel; 5, first inlet; 6, first outlet; 7, housing; 8, core mounting part; 9, mounting rack; 10, fluid mechanism; 11, fluid inlet; 12, fluid outlet; 13, motor chamber; 14, pump chamber; 15, front cushion; 16, rear cushion; 17, first elastic boss; 18, mounting seat; 19, mounting side plate; 20, slot; 21, connecting arm; 22, mounting slot; 23, second elastic boss; 24, damping plane; 25, first strip wall; 26, damping boss; 27, second strip wall; 28, limiting groove; 29, supporting plane; 30, third strip wall; 31, spacing rib; 32, wire passing channel; 33, clamping protrusion; 34, clamping groove; 35, mounting boss; 36, mounting platen; 37, avoidance groove; 38, control panel; 39, positioning groove.

DETAILED DESCRIPTION

It needs to be noted that without conflicts, embodiments and features in the embodiments of the present application may be mutually combined. The present disclosure will be described in detail below with reference to the accompanying drawings and in combination with the embodiments.

Figure 2:
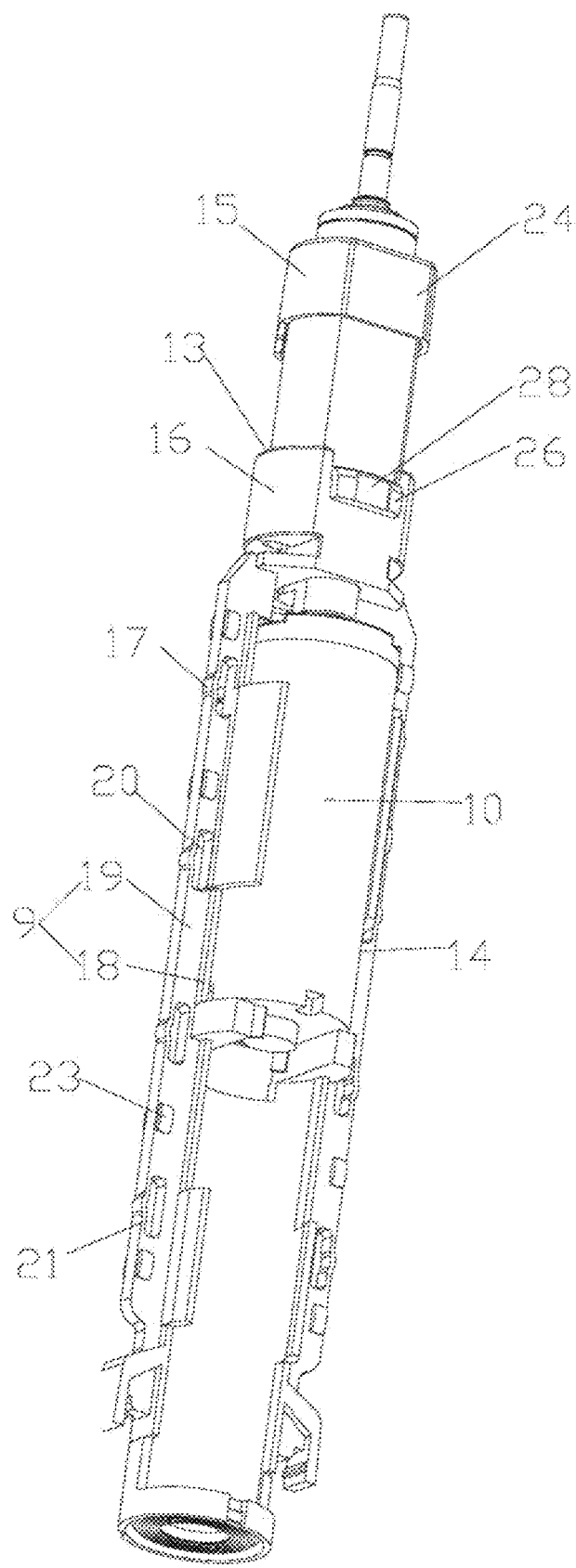
FIG. 2 shows a side view of a first shaft of a core of an oral cavity cleaning device of an embodiment of the present disclosure.
Figure 3:
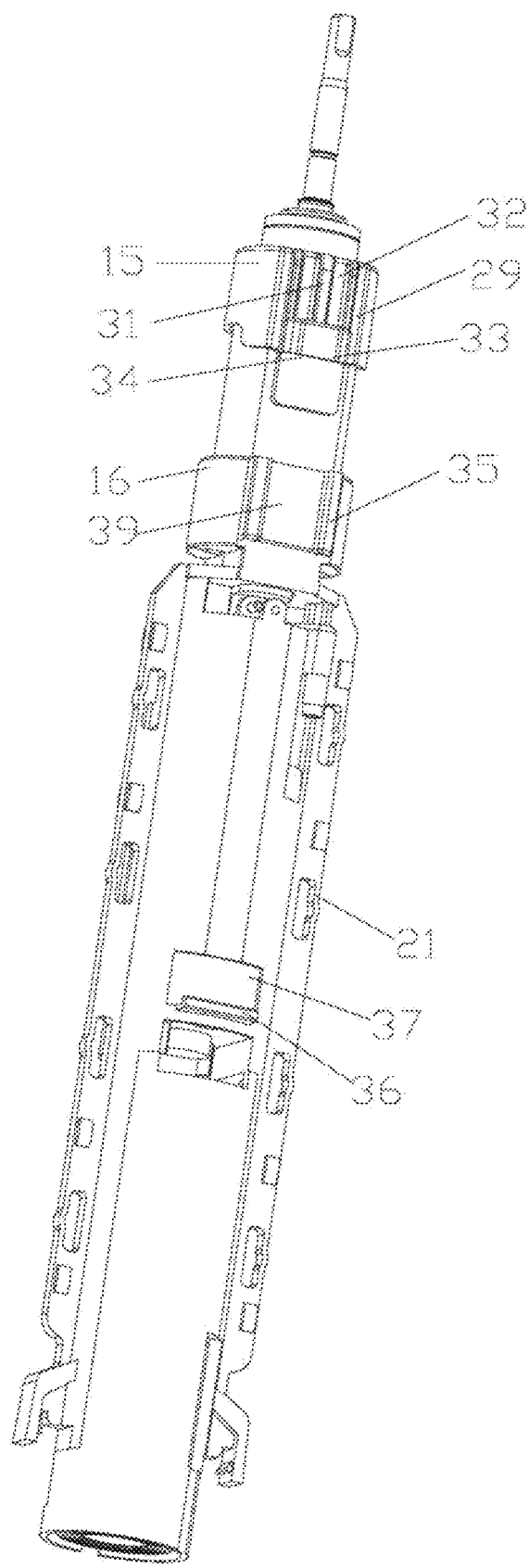
FIG. 3 shows a side view of a second shaft of a core of an oral cavity cleaning device of an embodiment of the present disclosure.
Figure 4:
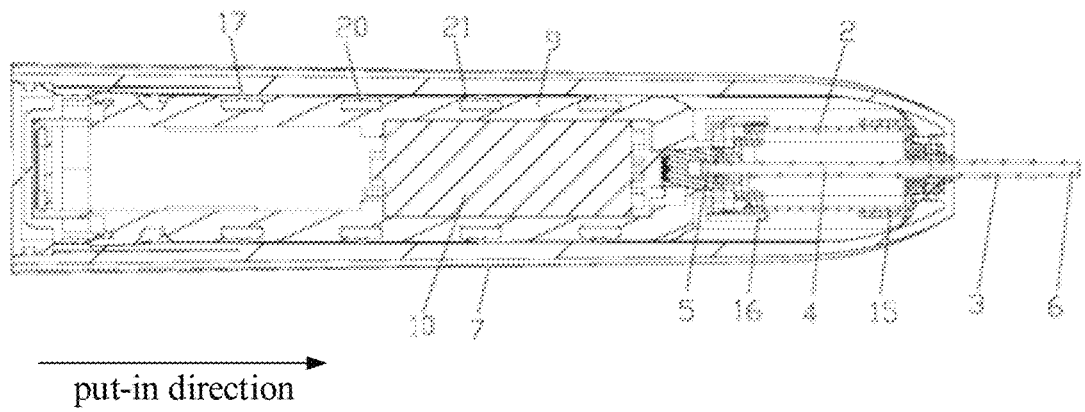
FIG. 4 shows a schematic diagram of an internal structure of a handle of an oral cavity cleaning device of an embodiment of the present disclosure.
Figure 5:
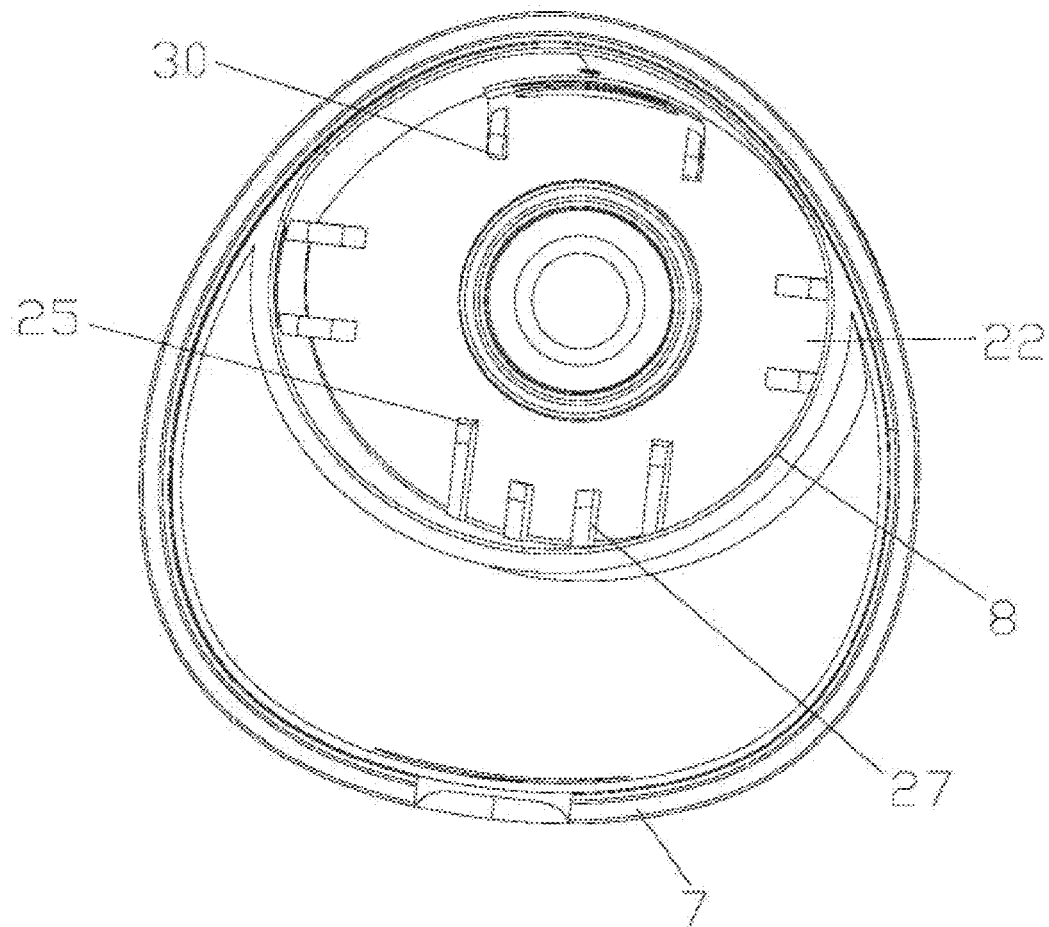
FIG. 5 shows a schematic structural diagram of a core mounting part of a handle of an oral cavity cleaning device of an embodiment of the present disclosure.

Referring to FIG. 1 to FIG. 5, the present disclosure provides an oral cavity cleaning device, including: a sonic motor 1, including a motor body 2 and a power output shaft 3, wherein the motor body 2 has an output axis extending in a power output direction, the power output shaft 3 is a columnar object extending along the output axis and penetrating through the motor body 2, the power output shaft 3 is configured to cooperate with the motor body 2 and transmit output power of the motor body 2, and the power output shaft 3 has an axial channel 4 parallel to the output axis and a first inlet 5 and a first outlet 6 communicating with the axial channel 4; a fluid mechanism 10, having a fluid inlet 11 and a fluid outlet 12, wherein the fluid outlet 12 communicates with the first inlet 5; a housing 7, extending in an axial direction of the power output shaft 3 and forming a tubular structure with a hollow interior, wherein the housing 7 includes a core mounting part 8, an mounting rack 9 is arranged in the core mounting part 8 and has a motor chamber 13 and a pump chamber 14, the sonic motor 1 is mounted in the motor chamber 13, and the fluid mechanism 10 is mounted in the pump chamber 14; a front cushion 15, arranged at a front end of the sonic motor 1 in a sleeved manner, wherein the front end of the sonic motor 1 is mounted in the core mounting part 8 by the front cushion 15; and a rear cushion 16, arranged at a rear end of the sonic motor 1 in a sleeved manner, wherein the rear end of the sonic motor 1 is mounted in the motor chamber 13 by the rear cushion 16.

The sonic motor cooperates with the core mounting part 8 by the front cushion 15 and the rear cushion 16, the sonic motor 1 may be not in direct contact with the core mounting part 8 by means of the front cushion 15 and the rear cushion 16, so the sonic motor 1 can be damped by means of damping performance of the front cushion 15 and the rear cushion 16, the sonic motor 1 is prevented from being in direct contact with the housing 7, vibration transmitted by the sonic motor 1 to the core mounting part 8 can be effectively reduced, vibration felt when a handle is held is reduced, a vibration noise is reduced, and the use experience of the user is improved.

In an embodiment, multi-point elastic contact is formed between a periphery of the mounting rack 9 and an inner wall of the core mounting part 8. In the embodiment, multi-point elastic contact is formed between the periphery of the mounting rack 9 and the inner wall of the core mounting part 8, so that a damping fit can also be formed between the mounting rack 9 and the core mounting part 8. Both the motor chamber 13 and the pump chamber 14 are located on the mounting rack 9, so vibration of the sonic motor 1 and the fluid mechanism 10 is transmitted to the core mounting part 8 by the front cushion 15, the rear cushion 16 and the mounting rack 9, the mounting rack 9 and the core mounting part 8 are in multi-point contact, by cooperating with the front cushion 15 and the rear cushion 16, vibration, when transmitted to the housing 7, is dispersed from centralized points of all vibration sources to the front cushion 15, the rear cushion 16 and all contact points between the mounting rack 9 and the core mounting part 8, thus a vibration action is dispersed, the whole vibration action of the core mounting part 8 is weakened, the vibration noise is reduced, and a good damping effect is realized.

In an embodiment, a plurality of first elastic bosses 17 are arranged on the periphery of the mounting rack 9 at intervals in an extending direction of the output axis, and the multi-point elastic contact is formed between the mounting rack 9 and the inner wall of the core mounting part 8 by the first elastic bosses 17.

In the embodiment, the plurality of first elastic bosses 17 are distributed in sequence in the extending direction of the output axis and can form a plurality of elastic contact points in sequence on the periphery of the mounting rack 9, so a good damping contact is formed between the whole mounting rack 9 and the core mounting part 8, and the damping effect is improved. The plurality of first elastic bosses 17 may be distributed uniformly, so that in a process of transmitting vibration energy from the mounting rack 9 to the core mounting part 8, energy distribution is more uniform, the vibration energy transmitted to all the contact points is more balanced, a vibration effect is further weakened, and damping and noise reduction effects are better.

In an embodiment, the mounting rack 9 includes a mounting seat 18, the motor chamber 13 is arranged on the mounting seat 18, mounting side plates 19 are respectively arranged on two opposite sides of the mounting seat 18, the two mounting side plates 19 extend away from each other, and the first elastic bosses 17 are arranged at edges of the mounting side plates 19 away from the mounting seat 18.

In the embodiment, a mounting gap is formed between the mounting rack 9 and the core mounting part 8 by using the mounting seat 18, mounting and securing of structures such as a control panel 38 are convenient, and a sufficient mounting space can be provided for arrangement of structures such as the control panel 38. Due to existence of the mounting side plates 19, a mounting fit between the mounting seat 18 and the core mounting part 8 may be conveniently implemented, and without affecting mounting and securing of the structures such as the control panel 38, mounting and securing of the mounting seat 18 in the core mounting part 8 are implemented. The mounting side plates 19 are respectively arranged on the two opposite sides of the mounting seat 18 and enabled to protrude in a direction away from the mounting seat 18, an assembling space may be formed on two sides of the mounting side plates 19 while mounting and securing of the mounting seat 18 are implemented by the mounting side plates 19, mounting of the structures such as the control panel 38 is implemented, and structural arrangement is more reasonable.

The mounting seat 18 cooperates with the core mounting part 8 by the mounting side plates 19, so the first elastic bosses 17 are arranged at edges of one sides of the mounting side plates 19 away from the mounting seat 18, multi-point elastic contact may be formed between the mounting seat 18 and the inner wall of the core mounting part 8 only by the first elastic bosses 17, no contact is formed between the other positions and the core mounting part 8, thus it is ensured that vibration of the sonic motor 1 and the fluid mechanism 10, after being transmitted to the mounting seat 18, can be transmitted to the core mounting part 8 only by the first elastic bosses 17, thus the damping effect of the mounting rack 9 can be further improved, and the damping noise is reduced.

In an embodiment, slots 20 penetrating each of the mounting side plates 19 in a thickness direction are formed in the mounting side plates 19, and connecting arms 21 located on one sides of the slots 20 away from the mounting seat 18 protrude in a direction away from the mounting seat 18 to form the first elastic bosses 17.

In the embodiment, the slots 20 are long-strip slots extending in a length direction of the mounting side plates 19, the connecting arms 21 are formed on outer sides of the long-strip slots, and connecting arms 21 protrude outwards in middle positions to form the first elastic bosses 17. The connecting arms 21 are uniform-thickness elastic structures and form arc-shaped protrusions outwards in the middle positions. The arc-shaped protrusions are located on the connecting arms 21, and the connecting arms 21 are located on the outer sides of the slots 20, so the connecting arms 21 are more prone to deformation, a deformation quantity is larger, the vibration energy can be more effectively absorbed and dissipated by deformation of the connecting arms under the vibration action, and the damping effect can be further improved.

In an embodiment, mounting slots 22 are formed in the inner wall of the core mounting part 8, the mounting slots 22 extend in a mounting direction of the mounting rack 9, and the mounting side plates 19 are clamped in the mounting slots 22.

In the embodiment, by forming the mounting slots 22 in the inner wall of the core mounting part 8, a guiding structure may be formed, the mounting rack 9 is conveniently put into the core mounting part 8 from an opening side of the core mounting part 8, mounting difficulty is lowered, and mounting efficiency is improved.

In the embodiment, mounting slots 22 are respectively formed in two opposite inner walls of the core mounting part 8 so that a more balanced and reliable mounting guiding and supporting structure may be formed.

The mounting slots 22 may be formed in the following mode: two guiding plates extending in the mounting direction of the mounting rack 9 are arranged on the inner walls of the core mounting part 8, the two guiding plates extend from one end to the other end of the core mounting part 8, and the mounting slots 22 are formed between the two guiding plates.

By arranging the mounting slots 22, the mounting rack 9 may be guided and limited by using the mounting slots 22 during mounting of the mounting rack 9, and after the mounting rack is mounted in place, a good positioning effect is realized.

In an embodiment, second elastic bosses 23 are formed on two opposite side walls of each of the mounting side plates 19, the second elastic bosses 23 protrude towards side walls of the mounting slots 22, and multi-point elastic contact is formed between the mounting side plates 19 and the side walls of the mounting slots 22 by the second elastic bosses 23.

In the embodiment, after the mounting slots 22 are formed, a surface contact is formed between the mounting side plates 19 and the side walls of the mounting slots 22, which may increase a vibration transmission effect and leads to reduction of a damping effect, in order to avoid the problem, in a mode that the second elastic bosses 23 are arranged on two side walls of each of the mounting side plates 19 cooperating with the mounting slots 22, multi-point elastic contact may be formed between the two side walls of the mounting side plates 19 and the side walls of the mounting slots 22, thus a vibration transmission action between the mounting side plates 19 and the side wall of the mounting slots 22 is reduced, the vibration transmission effect between the mounting side plates 19 and the side walls of the mounting slots 22 is weakened, multi-point elastic contact is formed between the whole mounting rack 9 and the core mounting part 8, and an more effective damping effect is realized.

In an embodiment, all surfaces of the first elastic bosses 17 and the second elastic bosses 23 protrude in an arc shape, it may be more effectively ensured that point contact or line contact is formed between the mounting rack 9 and the core mounting part 8 by the first elastic bosses 17 and the second elastic bosses 23, a contact area between the mounting rack 9 and the core mounting part 8 is reduced, the vibration transmission effect is weakened, and the damping effect is improved.

In an embodiment, in a put-in direction of the core mounting part 8, the first elastic bosses 17 and the second elastic bosses 23 are in staggered distribution, so distribution of elastic contact points may be more uniform, a distribution condition of a damping action force is optimized, and the damping effect is improved.

In an embodiment, the front cushion 15 has a damping plane 24, a first strip wall 25 protruding towards the damping plane 24 is arranged on the inner wall of the core mounting part 8, and the first strip wall 25 is tightly pressed and abuts against the damping plane 24.

In the embodiment, by arranging the first strip wall 25 on the inner wall of the core mounting part 8, the damping plane 24 of the front cushion 15 may cooperate with the core mounting part 8 by the first strip wall 25, a mounting and securing effect of the core mounting part 8 on the front cushion 15 may be ensured in a mode of extruding the damping plane 24 by the first strip wall 25, then a mounting and securing effect on the sonic motor 1 is realized by the front cushion 15, a contact area of the core mounting part 8 and the front cushion 15 can also be reduced by contact of the first strip wall 25 and the damping plane 24, the vibration transmission action is reduced, the damping effect on the sonic motor 1 is improved, the sonic motor 1 is prevented from being loosened and damaged during work, and the service life of the sonic motor 1 is guaranteed.

In an embodiment, on a side where the damping plane 24 is located, a damping boss 26 is arranged on the rear cushion 16, a second strip wall 27 protruding towards the damping boss 26 is arranged on the inner wall of the core mounting part 8, and the second strip wall 27 is tightly pressed and abuts against the damping boss 26.

In the embodiment, there are two first strip walls 25 and two second strip walls 27, the two first strip walls 25 are located on outer sides of the two second strip walls 27, and as cooperation of the core mounting part 8 and the damping plane 24 is realized by the two first strip walls 25 on two sides, balance of stress on the two sides can be guaranteed, and stability of a whole structure is better.

The two second strip walls 27 are tightly pressed on the damping boss 26, mounting and securing of the rear end of the sonic motor 1 are implemented by cooperation of the rear cushion 16 and the two second strip walls 27, and meanwhile, damping for the sonic motor 1 may be realized by means of the damping effect of the rear cushion 16. Due to existence of the damping boss 26, a supporting height of the rear cushion 26 is different from a supporting height of the damping plane 24, so heights of the first strip walls 25 are different from those of the second strip walls 27, thus the first strip walls 25 and the second strip walls 27 may form a better adapting relationship with cooperating structures, in the meantime, transmission of a vibration action is more dispersed, and the damping effect is better.

The front cushion 15 cooperates with the rear cushion 16 so that a more comprehensive supporting structure can be formed for the sonic motor 1, and meanwhile, the sonic motor 1 is more effectively prevented from being in direct contact with the core mounting part 8, so a better damping effect is formed on the sonic motor 1.

In an embodiment, a limiting groove 28 is formed in the damping boss 26, there are two second strip walls 27, an edge of one of the second strip walls 27 abuts against a groove wall of the limiting groove 28, and an edge of the other second strip wall 27 abuts against the other groove wall of the limiting groove 28.

In the embodiment, the two second strip walls 27 are limited in the limiting groove 28, a more effective limitation can be formed for the rear cushion 16 by means of cooperation of the limiting groove 28 and the second strip walls 27, the rear cushion 16 is prevented from generating a relative movement relative to the second strip walls 27 during work, and the damping effect of the rear cushion 16 is guaranteed.

In an embodiment, on a side opposite to the damping plane 24, supporting planes 29 are arranged at two sides edges of both the front cushion 15 and the rear cushion 16, third strip walls 30 protruding towards the supporting planes 29 are arranged on the inner wall of the core mounting part 8, and the third strip walls 30 are tightly pressed and abut against the supporting planes 29 of the front cushion 15 and the rear cushion 16.

In the embodiment, the third strip walls 30 are located on a side opposite to the first strip walls 25 and the second strip walls 27, the front cushion 15 may be tightly pressed and secured from the other side of the front cushion 15, thus tightly pressing and limiting the sonic motor 1 is implemented in a direction perpendicular to the mounting side plates 19, by cooperating with a limiting action of the mounting side plates 19, all-direction damping and limiting may be implemented for the sonic motor 1, the sonic motor 1 is effectively prevented from being loosened and damaged during work, and long-term stable reliable running of the sonic motor 1 is ensured.

In an embodiment, on a side where the supporting plane 29 of the front cushion 15 is located, a plurality of spacing ribs 31 are arranged on the front cushion 15, and a wire passing channel 32 is formed between every two adjacent spacing ribs 31.

In an embodiment, the oral cavity cleaning device further includes a control panel 38, the front cushion 15 further includes a clamping protrusion 33, a clamping groove 34 is formed in the clamping protrusion 33, a mounting boss 35 is arranged on the rear cushion 16, a positioning groove 39 is formed in the mounting boss 35, a mounting platen 36 is arranged on the mounting rack 9, an avoidance groove 37 is formed in the mounting platen 36, one end of the control panel 38 is clamped onto the mounting platen 36, the other end of the control panel 38 is clamped into the clamping groove 34, a middle of the control panel 38 is arranged in the positioning groove 39, and a height of the control panel 38 is smaller than a height of each of the front cushion 15, the rear cushion 16 and the mounting platen 36.

In the embodiment, screw holes are further formed in the mounting rack 9, and the control panel 38, after being mounted in place, may be further secured onto the mounting rack 9 by screws. The mounting platen 36 is of an L-shaped structure and forms a clamping groove with an outer surface of the mounting seat 18.

During mounting of the control panel 38, an end part of a first end of the control panel 38 may be clamped into the clamping groove 34 of the clamping protrusion 33, then a middle part falls into the positioning groove 39 in the rear cushion 16, an end part of a second end is clamped into the clamping groove formed by the mounting platen 36 and the mounting seat 18, mounting and positioning of the control panel 38 on the mounting rack 9 are implemented, then the control panel 38 is secured on the mounting rack 9 by the screws, and mounting and securing of the control panel 38 are completed. As the height of the control panel 38 is smaller than the height of each of the front cushion 15, the rear cushion 16 and the mounting platen 36, during work, the control panel 38 does not make direct contact with the core mounting part 8 under a protecting action of the front cushion 15, the rear cushion 16 and the mounting platen 36, and the control panel 38 is effectively prevented from bumping against the core mounting part 8 and is effectively protected.

As the plurality of spacing ribs 31 are arranged on the front cushion 15, the wire passing channel 32 is formed between every two adjacent spacing ribs 31, the clamping protrusion 33 is located at ends of the spacing ribs 31, and the clamping groove 34 communicates with the wire passing channel 32, after mounting of the control panel 38 is completed, a conducting wire may penetrate from the wire passing channel 32 and then passes through the clamping groove 34 to be connected with the control panel 38, thus wiring distribution is more orderly and reasonable, and a problem of exposure of the conducting wire is avoided.

Besides, the control panel 38 can be conveniently connected with the fluid mechanism 10 by the avoidance groove 37 formed in the mounting platen 36, and control over the fluid mechanism 10 is convenient.

It needs to be noted that terms used herein are only for describing specific implementations but not intend to limit exemplary implementations according to the present application. For example, unless otherwise indicated clearly in the context, a singular form used herein also intends to include a plural form. Besides, it should be further understood that a term "contain" and/or "include", when used in the specification, indicates that there are features, steps, operations, devices, components and/or their combination.

It needs to be noted that terms such as "first" and "second" in the specification, claims and the above accompanying drawings of the present application are used for distinguishing similar objects but not used for describing a specific sequence or a precedence order. It should be understood that data used like this may be interchangeable under appropriate conditions, so that implementations of the present application described herein can be implemented in a sequence in addition to those sequences illustrated or described herein.

The above description is only preferred embodiments of the present disclosure but is not used for limiting the present disclosure. As for those skilled in the art, the present disclosure may have various modifications and changes. Any modification, equivalent replacement, improvement and the like made within the spirit and the principle of the present disclosure should fall within the protection scope of the present disclosure.

What is claimed is:

1. An oral cavity cleaning device, comprising:
   a sonic motor, comprising a motor body and a power output shaft, wherein the motor body has an output axis extending in a power output direction, the power output shaft is a columnar object extending along the output axis and penetrating through the motor body, the power output shaft is configured to cooperate with the motor body and transmit output power of the motor body, and the power output shaft has an axial channel parallel to the output axis and a first inlet and a first outlet communicating with the axial channel;
   a fluid mechanism, having a fluid inlet and a fluid outlet, wherein the fluid outlet communicates with the first inlet;
   a housing, extending in an axial direction of the power output shaft and forming a tubular structure with a hollow interior, wherein the housing comprises a core mounting part, a mounting rack is arranged in the core mounting part and has a motor chamber and a pump chamber, the sonic motor is mounted in the motor chamber, and the fluid mechanism is mounted in the pump chamber;
   wherein,
   a front cushion, arranged at a front end of the motor body in a sleeved manner, wherein the front end of the sonic motor is mounted in the core mounting part by the front cushion; and
   a rear cushion, arranged at a rear end of the motor body in a sleeved manner, wherein the rear end of the sonic motor is mounted in the motor chamber by the rear cushion;
   wherein, multi-point elastic contact is formed between a periphery of the mounting rack and an inner wall of the core mounting part;
   a plurality of first elastic bosses are arranged on the periphery of the mounting rack at intervals in an extending direction of the output axis, and the multi-point elastic contact is formed between the mounting rack and the inner wall of the core mounting part by the first elastic bosses;
   the mounting rack comprises a mounting seat, the motor chamber is arranged in the mounting seat, mounting side plates are respectively arranged on two opposite sides of the mounting seat, the two mounting side plates extend away from each other, and the first elastic bosses are arranged at edges of the mounting side plates away from the mounting seat;
   slots penetrating each of the mounting side plates in a thickness direction are formed in the mounting side plates, and connecting arms located on one side of each of the slots away from the mounting seat protrude in a direction away from the mounting seat to form the first elastic bosses.

2. The oral cavity cleaning device of claim 1, wherein, mounting slots are formed in the inner wall of the core mounting part, the mounting slots extend in a mounting direction of the mounting rack, and the mounting side plates are clamped in the mounting slots.

3. The oral cavity cleaning device of claim 2, wherein, second elastic bosses are formed on two opposite side walls of each of the mounting side plates, the second elastic bosses protrude towards side walls of the mounting slots, and multi-point elastic contact is formed between the mounting side plates and the side walls of the mounting slots by the second elastic bosses.

4. The oral cavity cleaning device of claim 3, wherein, surfaces of the second elastic bosses are arc-shaped.

5. The oral cavity cleaning device of claim 3, wherein, in a put-in direction of putting the mounting rack from a open side of the core mounting part into the core mounting part, the first elastic bosses and the second elastic bosses are in staggered distribution.

6. The oral cavity cleaning device of claim 1, wherein, the front cushion has a damping plane, a first strip wall protruding towards the damping plane is arranged on an inner wall of the core mounting part, and the first strip wall is tightly pressed and abuts against the damping plane.

7. The oral cavity cleaning device of claim 6, wherein, on a side where the damping plane is located, a damping boss is arranged on the rear cushion, a second strip wall protruding towards the damping boss is arranged on the inner wall of the core mounting part, and the second strip wall is tightly pressed and abuts against the damping boss.

8. The oral cavity cleaning device of claim 7, wherein, a limiting groove is formed in the damping boss, there are two second strip walls, an edge of one of the second strip walls abuts against a groove wall of the limiting groove, and an edge of the other second strip wall abuts against the other groove wall of the limiting groove.

9. The oral cavity cleaning device of claim 6, wherein, on a side opposite to the damping plane, supporting planes are arranged at two sides edges of both the front cushion and the rear cushion, third strip walls protruding towards the supporting planes are arranged on the inner wall of the core mounting part, and the third strip walls are tightly pressed and abut against the supporting planes of both the front cushion and the rear cushion.

10. The oral cavity cleaning device of claim 9, wherein, on a side where the supporting planes of the front cushion is located, a plurality of spacing ribs are arranged on the front cushion, and a wire passing channel is formed between every two adjacent spacing ribs.

11. The oral cavity cleaning device of claim 10, wherein, the oral cavity cleaning device further comprises a control panel, the front cushion further comprises a clamping protrusion, a clamping groove is formed in the clamping protrusion, a mounting boss is arranged on the rear cushion, a positioning groove is formed in the mounting boss, a mounting platen is arranged on the mounting rack, a avoidance groove is formed in the mounting platen, one end of the control panel is clamped onto the mounting platen, the other end of the control panel is clamped into the clamping groove, a middle of the control panel is arranged in the positioning groove, and a height of the control panel is smaller than heights of each of the front cushion, the rear cushion and the mounting platen.

* * * * *